United States Patent [19]

Chaudot

[11] Patent Number: 4,527,632

[45] Date of Patent: Jul. 9, 1985

[54] SYSTEM FOR INCREASING THE RECOVERY OF PRODUCT FLUIDS FROM UNDERWATER MARINE DEPOSITS

[76] Inventor: Géard Chaudot, 14, Allee de La Rochefoucauld, 78570 Andresy, France

[21] Appl. No.: 501,790

[22] Filed: Jun. 7, 1983

[30] Foreign Application Priority Data

Jun. 8, 1982 [FR] France ................. 82 09976

[51] Int. Cl.³ ............................. E21B 43/01
[52] U.S. Cl. ................... 166/357; 166/54; 166/68.5
[58] Field of Search ......... 166/357, 53, 54, 54.1, 166/68, 68.5, 362

[56] References Cited

U.S. PATENT DOCUMENTS

| | | | |
|---|---|---|---|
| 2,142,376 | 1/1939 | Rodgers | 166/54 |
| 2,767,802 | 10/1956 | Orrell | 166/357 X |
| 3,045,751 | 7/1962 | Rodgers | 166/54 |
| 3,568,771 | 3/1971 | Vincent et al. | 166/68.5 X |
| 3,791,444 | 2/1974 | Hickey | 166/54 |
| 3,875,998 | 4/1975 | Charpentier | 166/357 |

Primary Examiner—Stephen J. Novosad
Assistant Examiner—Michael Starinsky
Attorney, Agent, or Firm—Scully, Scott, Murphy & Presser

[57] ABSTRACT

A system according to the invention includes a working well head 1 whose producing head is connected by a rigid or flexible pipe to at least one underwater degasifier tank. A pump 4 for lifting the product from the well or wells 1 is regulated by a control valve which responds to the discharge flow of liquids and/or variations in weight and/or buoyancy of the degasifier tank 3. A valve for regulating the flow of product from the well 1 is controlled by a second control means. The second control means may modulate the gas sealing pressure by pinching a stream of gas at some point in the piping in response to the relative buoyancy of said underwater degasification tank. Combinations of the various systems disclosed in the invention make it possible to increase the recovery of desired product fluids from an underwater deposit.

20 Claims, 7 Drawing Figures

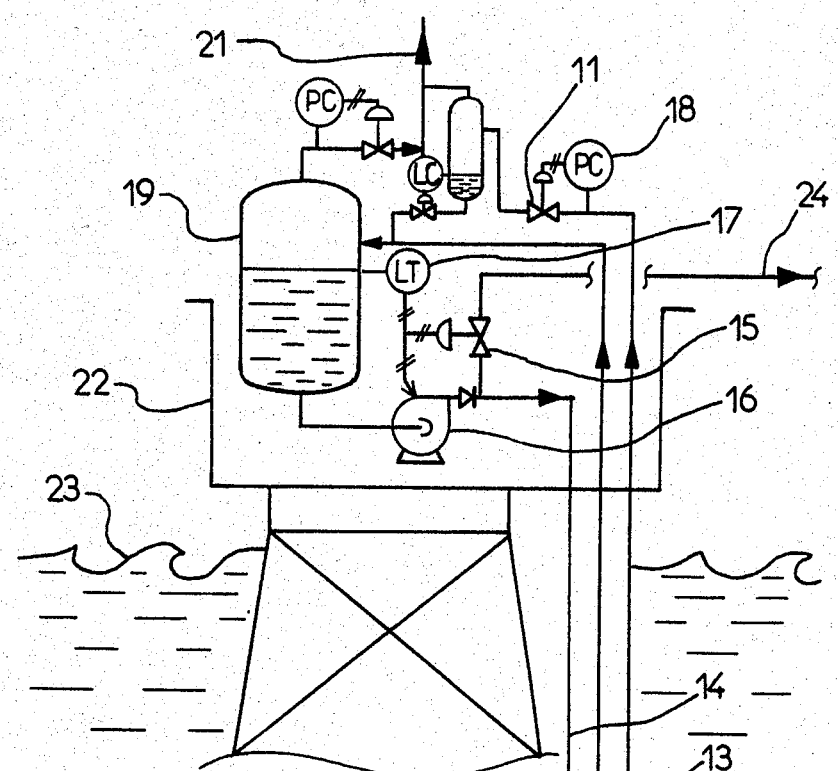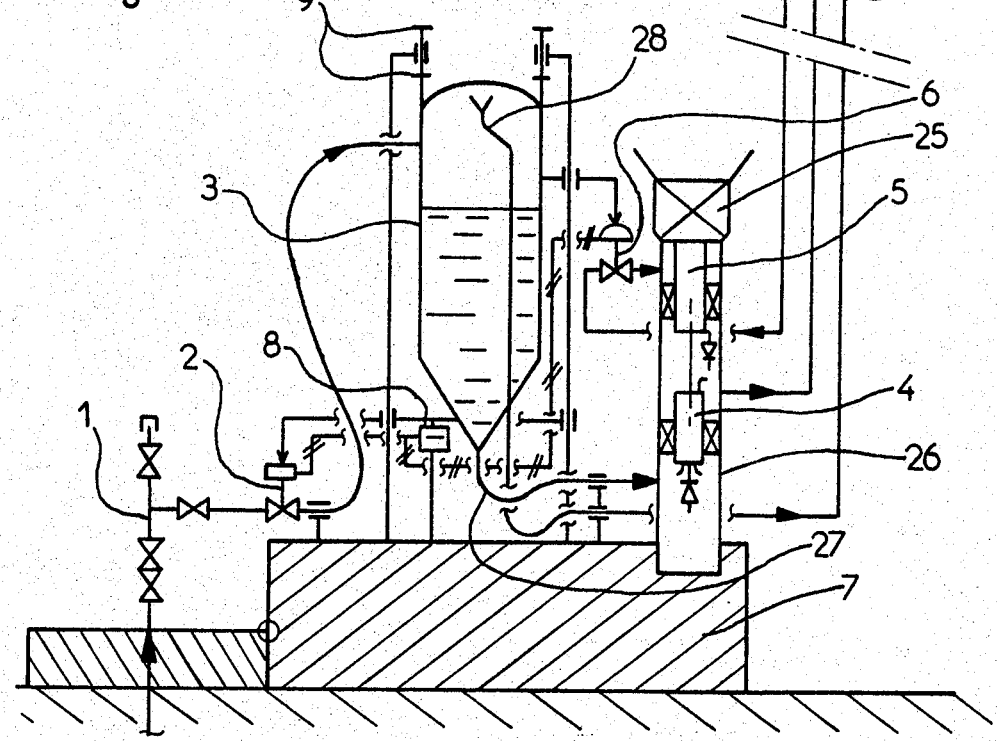
Fig.1

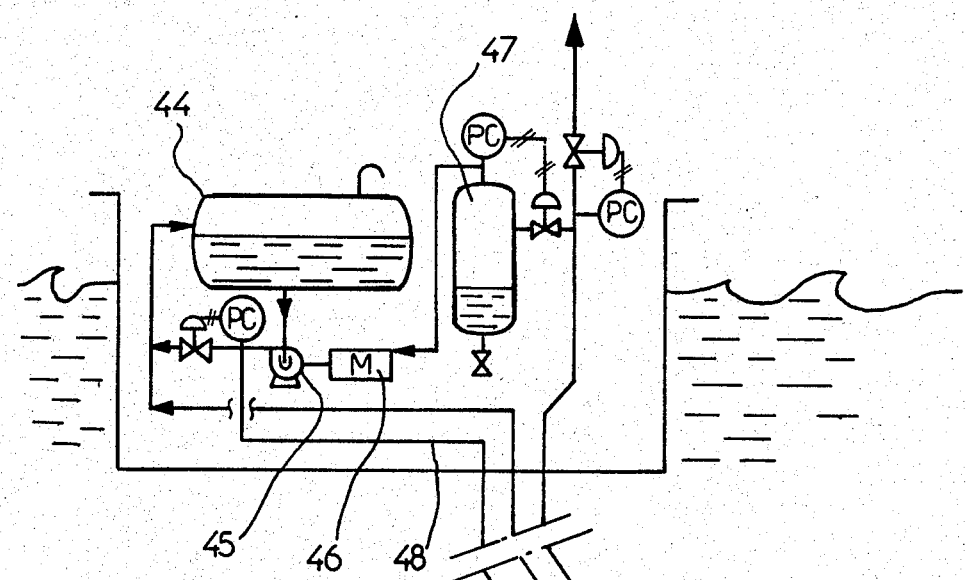
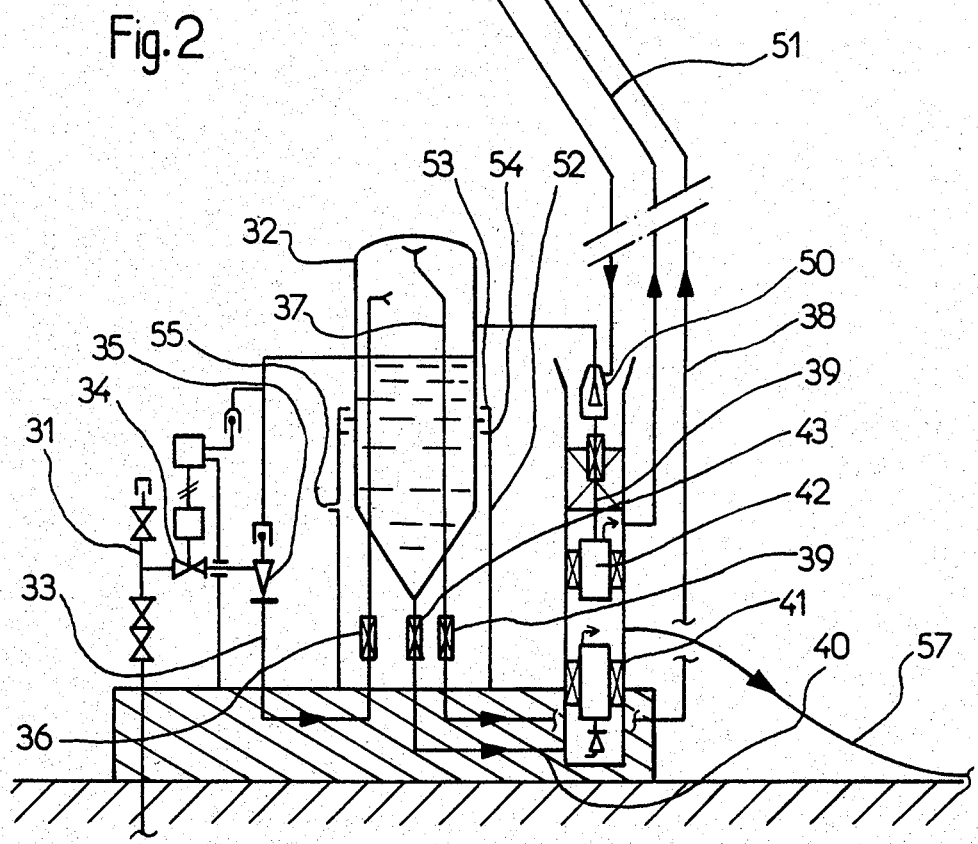
Fig. 2

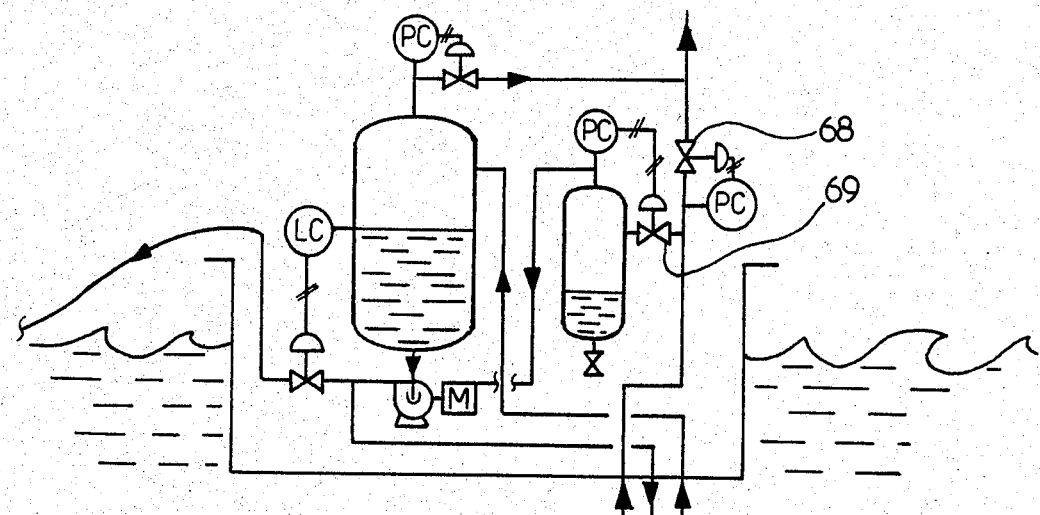
Fig. 3
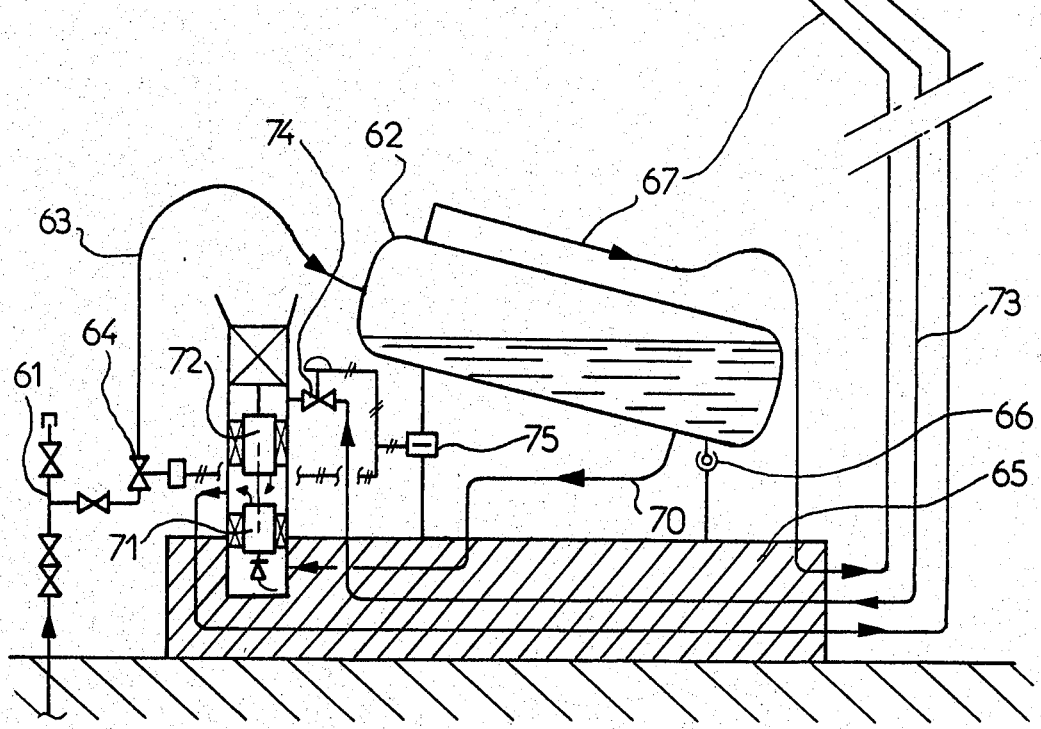

SYSTEM FOR INCREASING THE RECOVERY OF PRODUCT FLUIDS FROM UNDERWATER MARINE DEPOSITS

FIELD OF THE INVENTION

The present invention relates to a system of product recovery intended to initiate or permit the working of wells that do not produce naturally and/or to regulate the production of wells while simultaneously making it possible to increase recovery of fluids from an offshore underwater deposit.

BACKGROUND OF THE INVENTION

Generally speaking, offshore deposits of hydrocarbons require for their recovery the emplacement of a connection between the deposit and the surface installations that provide for transportation and storage of the fluids recovered. This connection is generally composed of wells equipped with submarine and/or aerial producing heads, and effluent or product piping between the producing heads and the separation and/or processing installations. These can be of very short length if the installations are located in proximity to the producing heads. The production installations make it possible to sort out the various phases of the product effluent, and provide a discharge means to a storage point for product(s) extracted from the deposit. The means described above are generally concentrated at least in part in one or more structures fixed to the sea bottom, or collected on the decks of floating structures.

Depending upon the flow, the nature of the product effluent, and the conditions of the outside environment, technological problems are frequently encountered that result in abandoning the development of a promising deposit discovery. Along these technological problems are the following examples:

(a) the inability to insure or maintain well product flow sufficient to the deposit profitably;

(b) the need to abandon the site prematurely while a substantial part of the product fluid remains in the deposit;

(c) the impossibility of insuring normal working conditions throughout the year due to adverse outside environments;

(d) finally, as soon as the depth of water becomes substantial and the environmental conditions severe, the existing technologies require installations of such size that they are reserved for working only large deposits. Those deposits so inconsistent that they may only be skimmed periodically are not worked. In any event, regulation of product flows and pressures, and the limitations of the latter imposed by the high level of safety required by confined installations combine to make them very complex. These installations require very skilled workers to operate and supervise them, even for deposits located in shallow water.

There are also deposits situated under a thin layer of "dead-terrain", in which the pressure is relatively low, regardless of the water depth. These pressure levels form a partial or complete bar to the present technology of development.

Certain deposits are also situated in zones where the surface of the sea is heavily traveled, or is partially obstructed by floating objects such as icebergs, iceflows, floatsum and driftwood. These deposits, sometimes associated with very bad conditions of visibility or detection, lead to a high probability of collision if all or part of the installation is located at the air-sea interface.

OBJECTS OF THE INVENTION

The object of the invention is therefore to eliminate all or part of these problems.

The invention proposes, a system of working a deposit wherein all or part of a set of elements which are selected by the characteristics of a deposit, its product affluent and the variation thereof during the life of the deposit, as well as the characteristics of the sea above the deposit are taken into consideration.

The invention also makes it possible to lower the head pressure of submarine wells to a very low pressure, that may be even close to atmospheric pressure, whatever the depth of the sea above the deposit, thereby increasing the recovery of fluids from the deposit.

It is further an object of the invention to make it possible to optimize the head pressure and the flow from each well as a function of the characteristics of the product deposit in each well in view of prevailing economic conditions.

It is another object of the invention to permit production from wells or deposits situated in very deep water.

It is another object of the invention to avoid most of the production uncertainties generated by surface conditions above the deposit.

It is another object of the invention to simplify operation of production while improving the safety conditions linked to those operations.

Finally, it is another object of the invention in a more general sense, to permit the working of deposits that would be unworkable by conventional methods for economic or technilogical reasons.

The system according to the invention, therefore, involves by directing the flow of product fluids the following elements:

(a) at least one working well, with a submarine producing well head being connected to an underwater degasifier tank by a rigid or flexible duct of steel or other material; or (b) a degasifier tank or separator tank located in the immediate vicinity of the producing well head, perhaps on a common base, or located at an optimum placement if the separator tank handles the output of a plurality of wells.

The separator tank is provided with various orifices, including, principally a first outlet for gas and a second outlet for product liquids. It has a property of bouyancy or floating in the water when it is partially or totally full of air or gas, and sinking if it is partially or totally full of liquids. In any event, it is designed so as to undergo detectable variations in weight when the interface level of liquid and gas fluctuates inside of it. In addition, its attachment to the seabottom and the ducting connected to it must permit a substantial deflection or range of stresses directly or indirectly. The invention also makes it possible to regulate the flow of product effluent and/or the flow of motor fluid and/or the intensity of the voltage of an electric current powering the pump raising the liquid product from the outlet of the degasifier tank to the surface installations.

The gas outlet of the degasifier tank is connected to the surface by flexible or rigid piping, equipped at its upper end with a pressure control valve or an adjustable calibrated check valve that makes it possible to vary the pressure setting inside the degasifier tank. The pressure is varied from an initial pressure at the producing head to a pressure close to atmospheric pressure at the level of the degasifier tank making allowance for the density of the gaseous effluent in the piping. The point of emergence of the gas exhaust piping can be different from the point of emergence of the outlet of the liquid product piping.

The liquid product outlet of the degasifier tank is therefore connected to a first pump means that may be a centrifugal pump with one or more stages, a positive displacement reciprocating pump, a pump driven by an electric motor of a variable speed or single speed type, a pump driven by a hydraulic motor. The hydraulic motor can be constructed with a turbine in which the motor fluid can be product effluent, partially or fully processed at the surface and repumped to the hydraulic motor through flexible or rigid piping. If the hydraulic motor is located at the bottom, the motor fluid can be remixed with the product effluent emerging from the lift pump or recycled to the surface by separate piping.

This method can also be augmented, depending on the problems to be solved, with the injection into the well, or into the product stream at the well head, of chemical agents, heat bearing fluids, or light hydrocarbons designed to promote the flow of product and diminish its density and thereby improve the productivity of the well.

The invention provides a simple method which makes it possible to lower the pressure of the well head to a very low level, whatever the depth of water in which the well head is immersed, which pressure can be controlled from the surface even if the distance between the well head and its controlled point is large. The flow of product from the well, which is a function of the pressure at the well head, is augmented by a first pump means whose output will be regulated automatically by the variation in buoyancy of the degasifier tank which separates the liquid and gas phases of the product. The capacity of the pump means will be at its maximum when the degasifier tank is full of liquids.

The degasifier tank as well as the elements cooperating in its connection and operation are designed to withstand the outside water pressure corresponding to the depth at which they are to be installed. They are also designed to withstand the inside pressure that may prevail within, with an allowance for the outside pressure they will be exposed to at the time of installation, or during handling while they are being placed or raised.

The degasifier tank and all or part of the elements cooperating in its operation, and in particular the pumping means for the liquid product may be raised from the surface simultaneously or independently of one another for control, maintenance, or replacement. Their attachment and their seals may be bolted collars, bayonet systems, anchor dogs, threads, packings in chevrons and elastic or plastic packers of types similar to those used in conventional working wells.

BRIEF DESCRIPTION OF THE DRAWINGS

Various methods of constructing the invention will be described below by way of non-limiting examples, with reference to the attached drawings in which:

FIG. 1 is a schematic representation of a first embodiment using the system of working according to a first example of the invention, in which all of the connecting pipes terminate at the surface at a single point.

FIG. 2 is a schematic representation of a second installation which damps the movement of the separator tank, wherein the surface connections terminate at two different points. The pump motor fluid circulating via pipes separate from those used for carrying the product from the well.

FIG. 3 is a schematic representation of a third installation in which the separator tank is articulated on its support by a hinge with a horizontal axis, wherein the range of movements of the separator tank is limited only by the flexibility of its connection.

DETAILED DESCRIPTION OF THE PREFERRED EMBODIMENT

Figure 4:
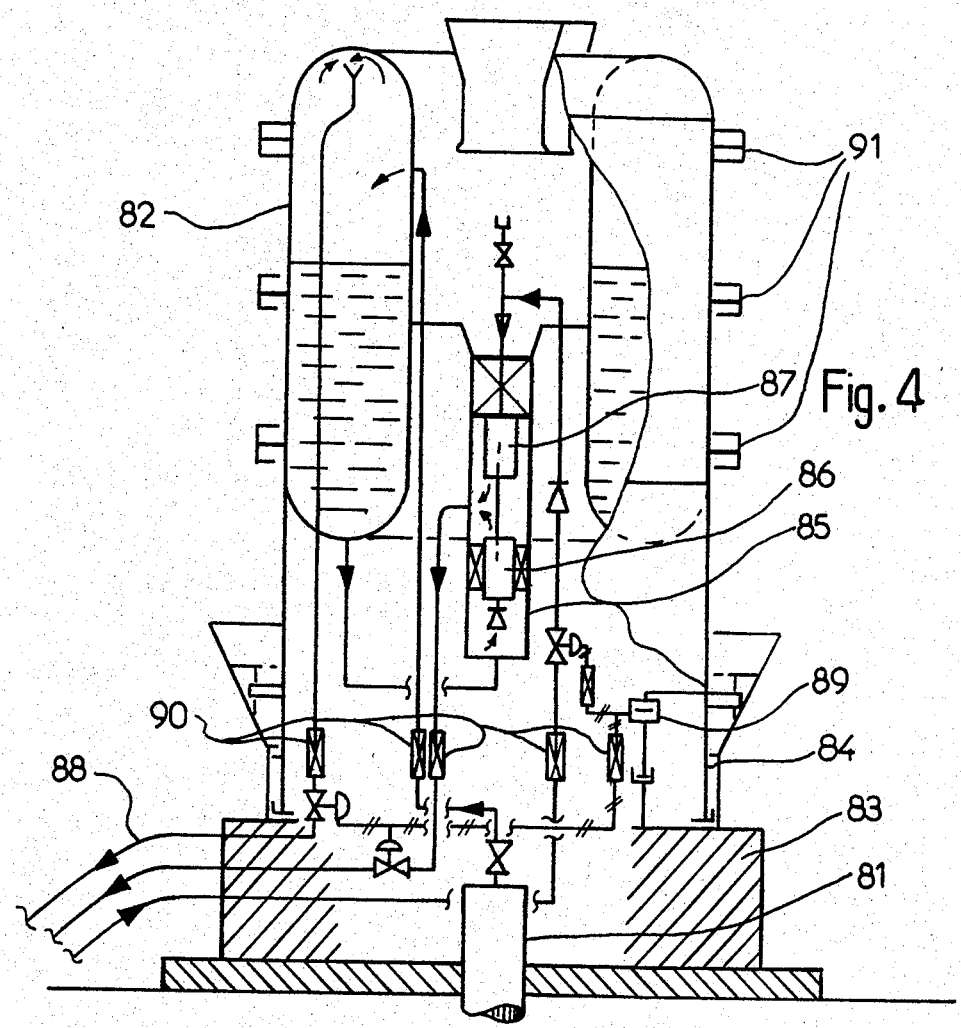
FIG. 4 is a schematic representation of a fourth installation in which all the elements are collected around a vertical axis which can be that of the well head.

Referring to FIG. 1, the installation has one or more producing wells connected to a degasifier tank 3 by flexible piping connected to the submarine producing well head 1. The flexible piping is equipped with a safety cutoff valve 2. The buoyancy of the underwater degasifier tank 3 varies with the liquid level inside the tank, and reciprocates vertically on guides equipped with top and bottom stops 9. The outlet for liquids 27 from the degasified tank 3, which is also flexible, is connected to the intake of a pump 4 driven by a hydraulic motor 5. The hydraulic motor fluid supplied by piping 14 is remixed with the liquid effluent from the degasifier tank 3 at the outlet from lift pump 4, and both are pumped to the input of the separation processing tank 19 by piping 13. The hydraulic motor fluid is a part of the flow of the effluent product recycled after separation or processing. The hydraulic pressure is raised by pump 16. The remaining liquid representing the production of the well is evacuated through piping 24. The flow from tank 19 is regulated by regulator valve 15 which is controlled or piloted by the level detector 17 and separator tank 19.

Variations in buoyancy or the vertical movements of degasifier tank 3 regulates by means of a regulator valve 6, the flow of hydraulic fluid to hydraulic motor 5, which in turn determines the output of liftpump 4.

The gas outlet 28 of degasifier tank 3 is also flexible and is connected to the atmosphere or to any installation for recovery of the gaseous effluent by duct or pipe 12 which terminates at 21. Piping 12 is also equipped with a pressure regulating valve 11 which is piloted by an upstream pressured detector 18, or an equivalent calibrated check valve.

A weighing cell 8, or equivalent transducer device such as a strain gauge, closes the safety valve 2 and the valve regulating the motor fluid 6 in the event of an abnormal operating condition or abnormal lateral movement of the degasifier tank 3. This is a safety feature to shut down the well in the event the structure is caught by an anchor, fishnet, or other submerged or floating object. Weighing cell 8 thereby shuts off the producing well and the pressurized motor fluid pipe.

The producing installation situated on the surface can be contained by deck 22 which is supported by a metal structure or tower, projecting above the level of the sea 23. Alternately, the surface installation may be mounted on any type of support, fixed or floating, and may project above or be mounted below the level of the sea or even situated on land.

Degasifier tank 3, the hydraulic motor 4, pump 5, and their accessories are held at the sea bottom by a ballast structure 7 or by any other means that will support the weight of the assembly and counteract the buoyancy of degasifier tank 3, this structure may also form part of the producing well head structure or be articulated thereto in such a way it is to facilitate the placement or removal when applicable or necessary.

Cutoff or check valves may be placed on the various lines of connection to the motor pump set 4, 5 but are not shown in FIG. 1 for reasons of clarity. A motor pump set 4,5 may constitute a sub-assembly that may be raised for maintenance and/or exchange, and mounted by a conventional means 25 in a receptacle 26.

The invention provides a simple means of production, having a high operational flexibility wherein parts that are subject to rapid wear can be exchanged during the life of the installation. The invention provides the following advantages:

1. If, at the beginning of production, the well has sufficient pressure to reach the surface installation with the desired flow, the motor pump set 4,5 will not be installed, and will be replaced by a simple plug 25. The motor pump set 4,5 is then installed when the natural flow from the well is no longer satisfactory.

2. The flow from the well, which is a function of its head pressure, is regulated by a valve 11 located at the surface which permits all desired adjustments to be made at the surface level. It is also possible to lower the submarine well head pressure to a level close to the atmospheric pressure prevailing at the depth of the well head, with allowance for the density of the gas separated in tank 3.

3. Regulation of the evacuation flow is automatically determined by the relative buoyancy of degasifier tank 3.

4. This method permits the working of very oblong deposits or deposits situated under a thin layer of "dead terrain" which are difficult to work and not profitable to work by means of conventional methods.

5. The motor 5 of liftpump 4 may also be an electric motor. The buoyancy detector for degasifier tank 3 actuates control circuitry to vary the intensity or voltage of the current supplied to the motor 5. Piping 14 is replaced in this embodiment by an electric feeder cable connected at the surface to a generator. In addition, the detection of the buoyancy can be transformed into electric signals or other modulated signals and transmitted to the surface by cable or optical fiber to modulate, at the surface, the power transmitted to the motor. Finally, two types of buoyancy detection transducers can be installed simultaneously, one backing up the other.

Referring to FIG. 2, the system according to the invention utilizes a circulation assembly for the product effluent. This assembly includes the following components.

One or more wells 31 are connected to a degasifier tank 32 by at least one pipe 33 equipped with a safety cutoff valve 34 and followed by a device 35 for restricting the fluid stream. A sliding joint 36 is provided with a reciprocating stroke sufficient to encompass the vertical movements of the degasifier tank 32.

The degasifier tank 32 is equipped with an outlet for gas 37 connected to the surface by piping 38 which is equipped with a sliding joint 39 having a reciprocating stroke sufficient to encompass the vertical movement of the degasifier tank.

An outlet 40 for the liquid product is equipped with a sliding joint 43 connected to the intake of a hydraulic motor pump set 41, 42 whose discharge opens into discharge pipe 37.

The hydraulic motor unit comprises, at the surface, a buffer tank of hydraulic fluid 44 supplying a pump 45 that may be driven by a motor 46 using the gas produced, recovered and treated at 47 by conventional means. Piping 48 supplies hydraulic fluid to the input side of the hydraulic motor 42 of the bottom pump, through a valve means 50. Valve 50 restricts or varies the stream of hydraulic fluid in response to variations in bouyancy of the degasifier tank 32.

After passage through the hydraulic motor 42, the motor fluid is returned to the surface, to buffer tank 44 by piping 51. The degasifier tank 32 can slide vertically in a skirt 52 which limits the movements of the degasifier tank by upper and lower stops 53, 54. The fluid contained in this skirt escapes therefrom or returns thereto through an orifice 55, thereby damping the vertical movements of the degasifier tank 32. The entire device rests and is anchored on the sea bottom by means of a ballast base 56 and can also serve as a base plate for the well head(s) 31. The degasifier tank 32, as well as the bottom motor pump can be raised from the surface for repair, maintenance, and replacement.

The means for supplying the hydraulic motor fluid, the recovery means and any venting to the atmosphere of the gaseous effluent, can be located in support structure situated in proximity to or at a distance from the well(s), while the discharge piping for liquid product 57 can carry the latter into a storage processing installation situated at some other point, or even on land.

Referring to FIG. 3, another arrangement of the system according to the invention is disclosed. The underwater producing well head(s) 61 is connected to the degasifier tank 62 by flexible piping 63 equipped with a safety cutoff valve 64. The degasifier tank 62 is fixed to a ballast base 65 by hinge 66 with a substantially horizontal axis. The main axis of the degasifier tank is inclined from the horizontal in order to create a substantially greater buoyancy at the end of the degasifier tank opposite the end equipped with the hinge.

The degasifier tank 62 has a flexible pipe 67 for evacuation of gas to the surface. Pipe 67 is equipped with a valve 68 for controlling the pressure in the degasifier tank and, if desired, with a valve 69 for collecting gas for uses in fuel or motor fluid. The liquid outlet 70 of degasifier tank 62 is connected to a motor pump set 71, 72 by a flexible pipe. The supply pipe 73 for hydraulic motor fluid to the motor pump set 71, 72 is regulated, according to the level in the degasifier tank 62, by a valve 74. Valve 74 is piloted by a transducer 75 which detects variations in buoyancy of the degasifier tank 62. In addition, the transducer cell 75 may actuate the safety cutoff valve 64 or any other safety valve deemed necessary.

If motor 72 of the motor pump set is electric, pipe 73 is replaced by an electric cable connected on the surface by a generator. Transducer cell 75 which detects the weight or buoyancy of tank 62 can be equipped with a cable or fiber optic for transmission of data to the surface to actuate valve 74, or to a control means for modulation of the electric power supplied from the surface to the electric motor.

It will be seen that in the example described above, it would be possible to use, instead of hinge 66, any elastically deformable structure which can support the weight and/or buoyancy of degasifier tank 62.

Referring to FIG. 4, a compact arrangement for using the invention is centered around a producing well head in order to facilitate the placement and removal of the various elements. It has one or more well heads 81 connected to a degasifier tank 82 of torroidal shape with a long vertical axis. The tank 82 is secured to a ballast base 83 by conventional locks 84 which define therebetween sufficient travel to make it possible to detect the variations in weight or buoyancy of the degasifier tank 82. In its interior chamber, the degasifier tank is equipped with a receptacle 85 making it possible to mount the motor pump 86-87 for evacuating the liquid product.

As in the preceeding examples, the regulation of pressure at the well head and consequently of the flow of product from the well, was done from the surface by a pressure control device placed in the evacuation piping 88 for the gaseous effluent. The discharge flow of the liquid product being regulated by fluctuations in level of the degasifier tank and by means of a transducer cell 89 which detected weight or buoyancy changes to actuate the variations in power supplied to motor 87 of the motor lift pump set. All the connections of piping between ballast base 83 and the degasifier tank 82 are made by means of sliding joints 90 or flexible ducts. If necessary, the fluctuation in buoyancy of the degasifier tank 82 can be damped by hoopings 91 which damp the movements in the water and also reinforce the strength of the degasifier tank.

Figure 5:
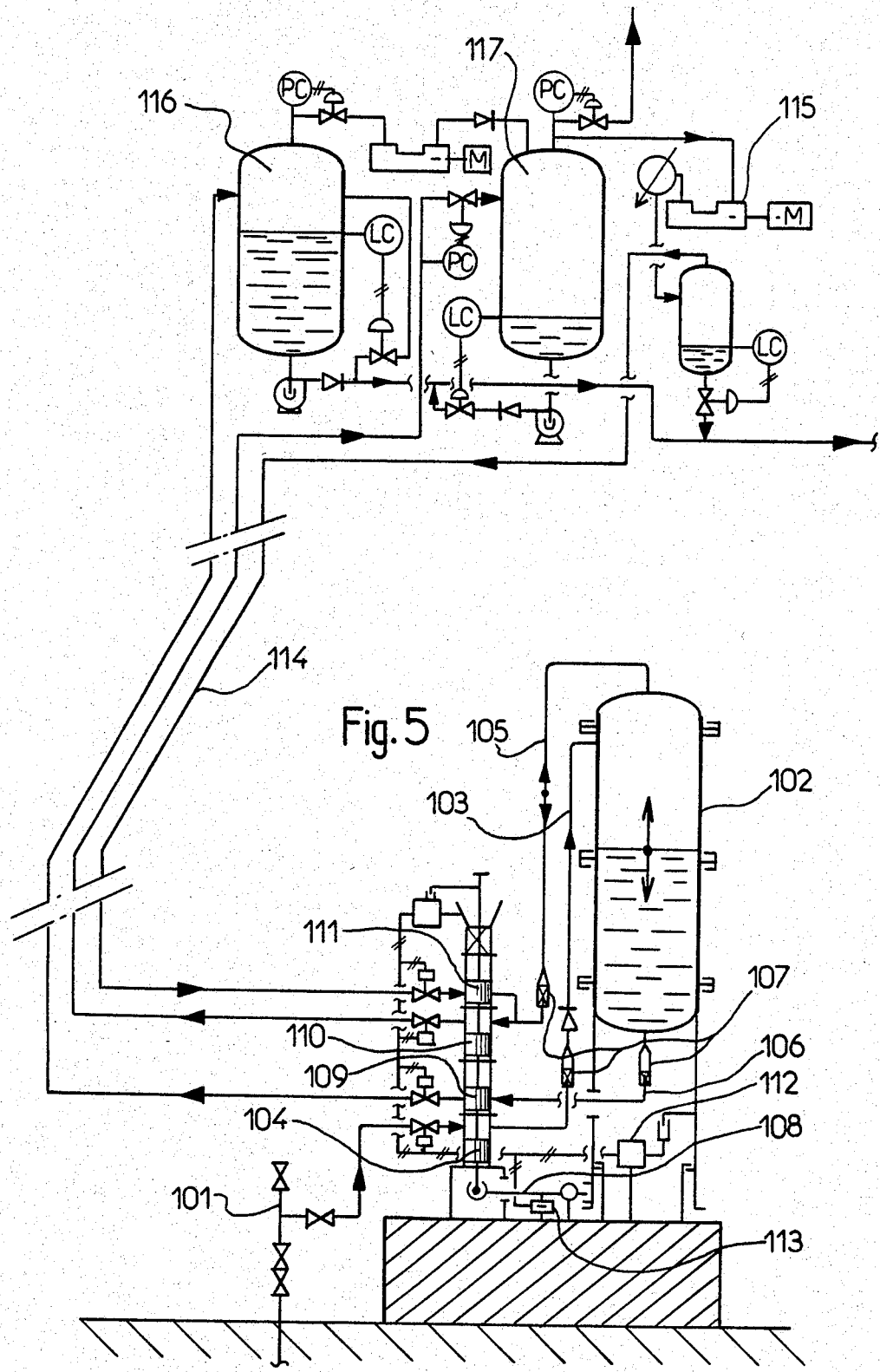
FIG. 5 is a schematic representation of a fifth installation in which the hydraulic motor fluid for lifting the liquid products is gas, which is regulated by a distributor slide-valve system.

FIG. 5 is an example of the application of the invention to wells that are subject to discontinuities in production resulting from a poor supply to the well from the producing stratum, or an excessively high viscosity of the product. The movement of the product from the well, from the degasifier tank to the surface, is obtained by a "blow case" pump with a succession of alternate flows and blows being controlled by variations in buoyancy of the degasifier tank. The buoyancy of the tank 102 operates a distributing slide valve for the product from the well, the blown liquid product, the gaseous effluent and the blow gas. The installation has a producing well head 101 connected to the variable buoyancy degasifier tank 102 by piping 103 which is equipped with a slide valve 104. A degasifier tank 102 reciprocates vertically as its buoyancy varies with the liquid level inside the tank. The inputs 103 for the well output, the gas inlet and outlet 105 and liquid product outlet 106 are fitted with sliding joints 107 or connected by flexible piping to the fixed parts of the installation. The movements of the degasifier tank actuator lever 108 or other means causes the vertical reciprocation of slide valve 104. The valve 104 regulates the entry of well product effluent, slide valve 109 pumps the liquid product to the surface, slide valve 110 regulates the discharge of gaseous effluent, and slide valve 111 discharges the blow gas. All reciprocate simultaneously.

A detector or transducer 112 for monitoring abnormal lateral movements of the degasifier tank 102 and a detector or transducer 113 for monitoring abnormal positions of control level 108 for the slide valves may be installed when desired to insure the safety of the installation.

A supply of blow gas is provided by piping 114 from a compression unit 115 situated on the surface above the well head. The gas used in this process may be the gas combined with the liquid product in the well and recovered at 116 and 117, and recycled. It may also be gas from other wells or other deposits, or even gas manufactured on the surface such as nitrogen or the like. A portion of the gas produced can even be used to supply energy to the compressors and the elements necessary for the working of the installation, with any excess gas flared to the atmosphere or discharged.

Figure 6:
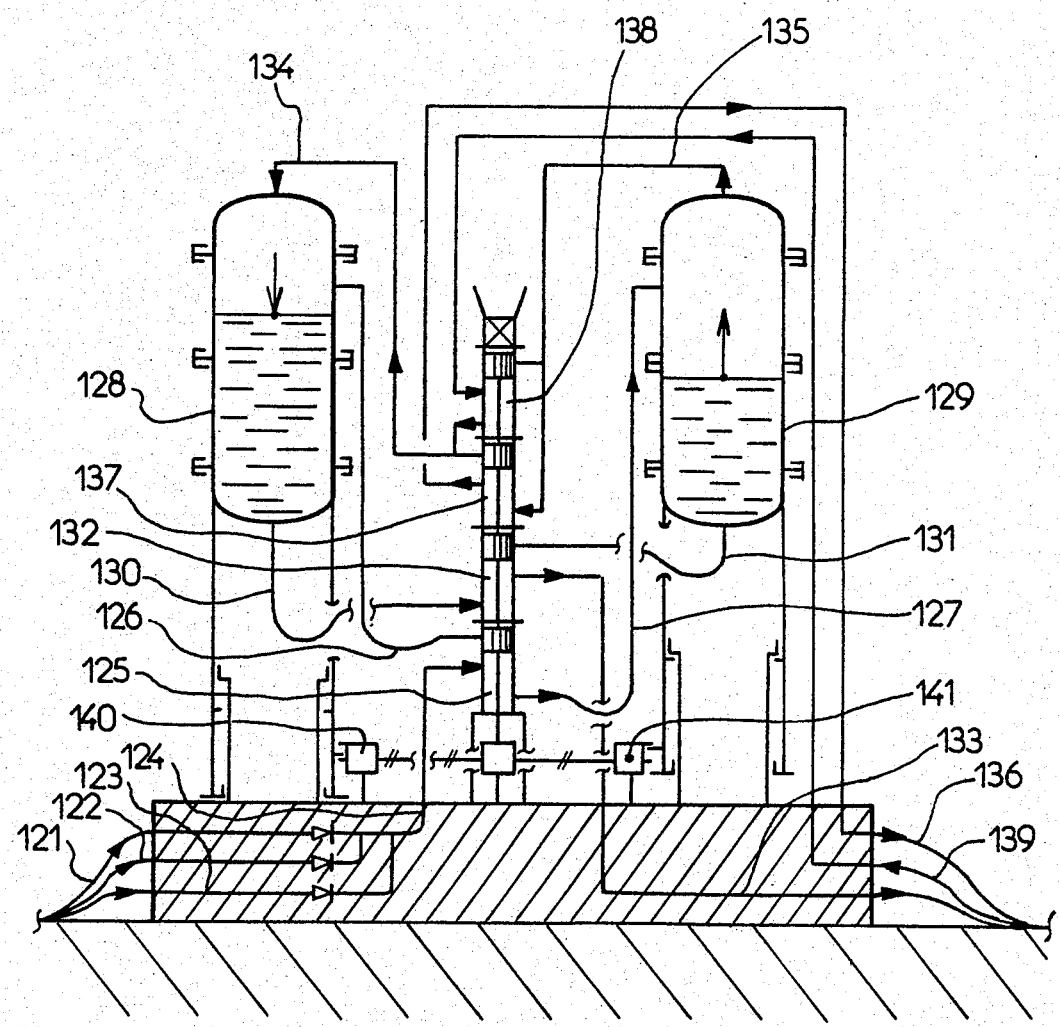
FIG. 6 is a schematic representation of a sixth installation similar in principle to that used in the fifth installation, but permitting continuous flow from a well or wells connected to it.

FIG. 6 is an extension of the system described in the preceeding Figures, which is applicable to one or more wells when it is desired to continue production during the periods when the effluent is being raised to the processing and storage installations. It is based on the utilization of a "blow case" pump as disclosed in the example of FIG. 5, but involves at least two degasifier tanks, one of which will be filling while the other is discharging. The sequence of filling and discharging the two degasifier tanks may be controlled by a single set of pilot slide valves.

Depending on the type of deposit, the grades of the product, and the regularity of the flow, the installation, according to the invention, can includes a plurality of degasifier tanks connected to a single well, just as it may include a plurality of wells connected to a single pair of degasifier tanks.

In the illustration of FIG. 6, the installation has three inputs from wells 121, 122, and 123 joined together by a manifold 124 which opens into slide valve 125 connected to the entry ports 126 and 127 of the degasifier tanks 128 and 129. Tank 128 is discharging, while tank 129 is being filled by the wells through manifolds 124 and valve 125. The outputs of liquid product 130 and 131 are connected to a surface liquid discharge piping 133 through a slide valve 132.

The gaseous effluent outlets 134 and 135 are connected to a surface gas discharge pipe 136 by a slide valve 137 and the intake pipe 139 for blow gas is connected to ducts 134 and 135 by a slide valve 138. Transducer cells detecting variations in weight or buoyancy of tanks 140 and 141 cause a set of slide valves to operate between first and second positions. Regulation of the flow from the wells, which is a function of their head pressure, is controlled by a pressure regulator valve which may be placed at the surface on duct 136.

Figure 7:
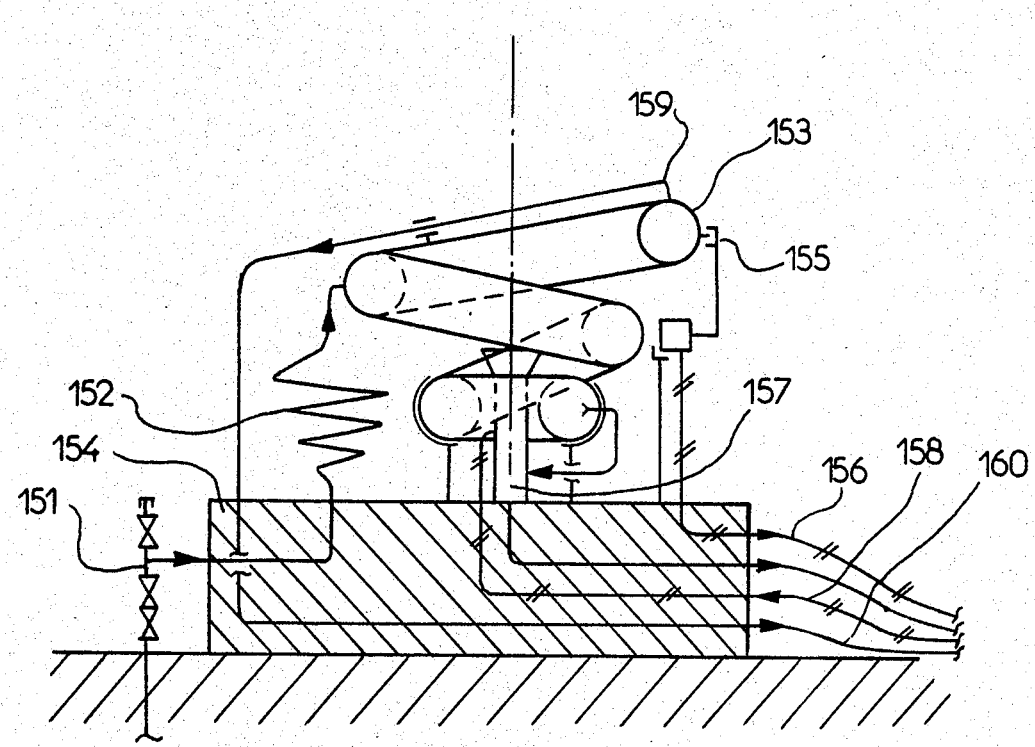
FIG. 7 is a schematic representation of a seventh installation in which the degasifier tank is fixed on the ballast base, but which can undergo elastic deformations in response to variations in buoyancy, said tank being formed to provide a large heat exchange surface to cool the effluent from the well.

As illustrated in FIG. 7, the system includes a well 151 connected to a degasifier tank 153 by a flexible pipe 152, a part of which is a conical spiral which permits by its elasticity a relative amount of upper vertical movement with respect to the ballast base 154. The conical spiral also constitutes a heat exchanger with the medium in which it is emerged, such as the sea.

The degasifier tank 153 is also in the form of a conical spiral with the lower end fixed on the ballast base, and the upper end free floating as its buoyancy varies.

The form given to the degasifier tank 153 permits a generous heat exchange with the outside medium, a substantial effluent degasification surface and substantial variations in displacement of the upper end of the degasifier tank in response to the influence of variations in buoyancy resulting from variations in the level of liquid which it contains. These variations in displacement are monitored by a detector or transducer 155 which transmit to the surface by a cable or optical fiber 156 a signal which modulates the motive power transmitted to pump 157 by power cable 158. The gas outlet 159 from degasifier tank 153 is connected by a pipe 160 that is flexible to the surface, to a pressure regulator valve which permits adjusting the flow from the well at the desired level.

What is claimed is:

1. A system for recovering fluids from underwater deposits, said system comprising:
   (a) at least one underwater degasification tank, said tank being mounted for buoyancy movement in response to the ratio of gas and fluid product contained by said tank;
   (b) a means for connecting the output of a producing well head to said degasification tank;
   (c) first pump means for regulating the discharge of product from the tank(s) to the surface;
   (d) first control means for said first pump means to regulate the discharge of said product in response to variations in the gas pressure in said degasification tank;
   (e) a valve means for regulating the flow of product from said well head to said degasification tank;
   (f) a second control means for regulating said valve means in response to buoyancy movements of said degasification tank.

2. A system as claimed in claim 1 which further comprises transducer means to monitor the movement of said underwater degasification tank, and means connecting said transducer means with said second control means.

3. A system as claimed in claim 1 wherein said first means for regulating the discharge of product from said tank(s) further comprises a hydraulic motor and pump.

4. A system as claimed in claim 1 wherein said first pump means regulates the discharge of product from said tank(s) which further comprises a blow case pump whose motive force is provided by variations in buoyancy of said tank(s)

5. A system as claimed in claim 1 or 2 or 3 wherein said control means for said first pump means comprises a regulator valve which responds to buoyancy variations of said degasifier tank to regulate the discharge of product from said degasifier tank through said first pump means.

6. A system as claimed in claim 1 or 2 or 3 or 4 wherein said control means for said first pump means is remotely located at the water surface level.

7. A system as claimed in claim 6 wherein said control means remotely senses the buoyancy of said degasification tank pneumatically by piping the gas present in said degasification tank to said first control means at the surface.

8. A system as claimed in claim 6 wherein said control means remotely senses the buoyancy of said degasification tank electrically by means of a pressure transducer.

9. A system as claimed in claim 1 wherein said first pump means is electronically driven and said control means derives a control signal from said degasification tank by means of an electrical transducer.

10. A system as claimed in claim 1 or 3 or 4 wherein said first pump means is hydraulically driven, said hydraulic fluid being derived from the product pumped from said well head.

11. A system as claimed in claim 1 or 2 or 3 or 4 wherein said degasification tank is mounted for vertical reciprocation in response to buoyancy variations of said tank.

12. A system as claimed in claim 1 or 2 or 3 or 4 wherein said degasification tank is mounted for pivotal movement about a horizontal axis in response to buoyancy variations.

13. A system as claimed in claim 1 or 2 or 3 or 4 wherein said degasification tank extends vertically in a spiral in response to buoyancy variations.

14. A system as claimed in claim 13 wherein said degasification tank further defines a heat exchanger between said product fluid and the surrounding water.

15. A system as claimed in claim 1 or 2 or 3 or 4 wherein said degasification tank is torroidal and defines an inner chamber for said first pump means, said valve means and said second control means.

16. A system as claimed in claim 4 wherein said blow case pump has a first filling cycle and a second pumping cycle, said system having a plurality of degasifier tanks connected thereto.

17. A system as claimed in claim 1 or 2 or 3 or 4 wherein a plurality of well heads are connected to said system.

18. A system as claimed in claim 1 or 2 or 3 or 4 which further includes a separation tank mounted near the water level.

19. A system as claimed in claim 1 or 2 or 3 or 4 wherein the pressure at said well head is vented through said degasification tank to near atmospheric pressure by means of a pipe and a pressure regulating valve that extends above the water level.

20. A system as claimed in claim 19 wherein the flow from said first pump means is regulated by both said first control means and said pressure regulating valve.

* * * * *